(12) United States Patent
Suzuki

(10) Patent No.: US 8,321,884 B2
(45) Date of Patent: Nov. 27, 2012

(54) CLAMP FOR DISK ROTATION DRIVING DEVICE AND METHOD OF MANUFACTURING CLAMP

(75) Inventor: Satoru Suzuki, Aikoh-gun (JP)

(73) Assignee: NHK Spring Co., Ltd., Kanagawa (JP)

( * ) Notice: Subject to any disclaimer, the term of this patent is extended or adjusted under 35 U.S.C. 154(b) by 0 days.

(21) Appl. No.: 12/992,407

(22) PCT Filed: Mar. 24, 2009

(86) PCT No.: PCT/JP2009/001283
§ 371 (c)(1),
(2), (4) Date: Nov. 12, 2010

(87) PCT Pub. No.: WO2009/139103
PCT Pub. Date: Nov. 19, 2009

(65) Prior Publication Data
US 2011/0093874 A1    Apr. 21, 2011

(30) Foreign Application Priority Data
May 13, 2008   (JP) ................................ P2008-126356

(51) Int. Cl.
*G11B 17/028* (2006.01)
*B21D 31/06* (2006.01)
(52) U.S. Cl. ...................... 720/712; 72/379.2
(58) Field of Classification Search .............. 360/97.01, 360/98.08, 99.12, 99.05; 720/706, 703, 712; 72/379.2, 380, 324
See application file for complete search history.

(56) References Cited

U.S. PATENT DOCUMENTS

| | | | | | |
|---|---|---|---|---|---|
| 4,918,545 | A | * | 4/1990 | Scheffel | 360/98.08 |
| 5,461,523 | A | * | 10/1995 | Hoshi | 360/99.12 |
| 5,572,383 | A | * | 11/1996 | Hoshi et al. | 360/99.05 |
| 5,694,269 | A | * | 12/1997 | Lee | 360/98.08 |
| 5,790,346 | A | * | 8/1998 | Fletcher | 360/99.12 |
| 5,822,151 | A | * | 10/1998 | Albrecht et al. | 360/98.08 |
| 5,828,518 | A | * | 10/1998 | Moir et al. | 360/99.12 |
| 6,417,988 | B1 | * | 7/2002 | Renken et al. | 360/99.12 |
| 6,563,668 | B1 | * | 5/2003 | Suwito | 360/98.08 |

(Continued)

FOREIGN PATENT DOCUMENTS
JP    9-091816    4/1997
(Continued)

*Primary Examiner* — Julie Anne Watko
(74) *Attorney, Agent, or Firm* — Jordan and Hamburg LLP

(57) ABSTRACT

A clamp 1 for a disk rotation driving device 3 has a centering hole 18 and a contact portion 17. The centering hole 18 is fitted to an outer circumference of a centering projection 19 of a hub 7 of the disk rotation driving device 3. A clamping screw 21 is screwed into an axial center of the hub 7 so that a fastening head 23 of the clamping screw 21 fastens the clamp 1 to the hub 7 and so that the contact portion 17 of the clamp 1 comes in contact with an information recordable magnetic disk 5 attached to the hub 7 and applies pressing load onto the disk 5 in a rotation axis direction. The clamp 1 includes a centering cylinder 13 bent in an axial direction. The centering cylinder 13 has a circumferential inner surface. The inner surface defines the centering hole 18. The rounded section 29 is provided along an edge of the centering hole 18 and has a radius smaller than the thickness of the centering cylinder 13. The fastening surface 25 is continuous to the rounded section 29.

4 Claims, 4 Drawing Sheets

U.S. PATENT DOCUMENTS

| | | | |
|---|---|---|---|
| 6,567,238 B1* | 5/2003 | Renken et al. | 360/99.12 |
| 6,788,495 B2* | 9/2004 | Aiello | 360/99.12 |
| 7,016,147 B2* | 3/2006 | Choo et al. | 360/99.12 |
| 2002/0024763 A1* | 2/2002 | Drake et al. | 360/99.12 |
| 2003/0169533 A1* | 9/2003 | Aiello | 360/98.08 |
| 2005/0099723 A1* | 5/2005 | Momoi | 360/99.12 |
| 2005/0162776 A1* | 7/2005 | Kim | 360/99.12 |
| 2006/0002012 A1* | 1/2006 | Chan et al. | 360/99.12 |
| 2006/0132965 A1* | 6/2006 | Katsuta et al. | 360/97.01 |

FOREIGN PATENT DOCUMENTS

| | | | |
|---|---|---|---|
| JP | 9-306073 | | 11/1997 |
| JP | 2003-338101 | | 11/2003 |
| JP | 2004-015842 | | 1/2004 |
| JP | 2004015842 A | * | 1/2004 |
| JP | 2004-095054 | | 3/2004 |
| JP | 2004-234793 | | 8/2004 |
| JP | 2004234793 A | * | 8/2004 |
| JP | 2008-077807 | | 4/2008 |

* cited by examiner

CLAMP FOR DISK ROTATION DRIVING DEVICE AND METHOD OF MANUFACTURING CLAMP

FIELD OF THE INVENTION

The present invention relates to a clamp for a disk rotation driving device and a method of manufacturing the clamp, the disk rotation driving device being a hard disk drive (HDD) or the like installed in an information processing apparatus such as a computer.

BACKGROUND OF THE INVENTION

There are conventional clamps for a disk rotational driving device as shown in FIG. 7 disclosed in Patent Literatures 1 and 2.

Such a clamp 101 has a central part 103, a centering hole 105 formed through the central part 103, a peripheral part, and a contact portion 107 formed along the peripheral part. The clamp 101 is attached to a hub 109 to be rotary driven of a hard disk drive. A clamping screw 111 is screwed into the hub 109 so that a fastening head 113 of the clamping screw 111 fastens the central part 103 to the hub 109.

The centering hole 105 of the clamp 101 is fitted to a centering projection 115 circumferentially formed on the hub 109, to center the clamp 101.

The contact portion 107 of the clamp 101 fixed to the hub 109 comes in contact with a magnetic disk 117 attached to the hub 109, to apply pressing load onto the magnetic disk 117 in an axial direction, to thereby fix the magnetic disk 117 to the hub 109.

The centering hole 105 of the clamp 101 has a centering surface that fits the centering projection 115 of the hub 109. According to the related arts, the axial length of the centering surface is equal to the thickness of the clamp 101, and therefore, is insufficient to secure a centering surface.

Namely, a guiding function of the centering hole 105 with respect to the centering projection 115 is insufficient when attaching the clamp 101 to the hub 109. This results in deteriorating a fitting efficiency and a fitting accuracy of the clamp 101 with respect to the hub 109.

The insufficient guiding function may cause an assembling error, e.g. placing the centering hole 105 on the centering projection 115.

On the other hand, the clamp may be provided with a centering cylindrical portion that is formed by burring to axially protrude. An inner circumference of the centering cylindrical portion defines a centering hole. This configuration may elongate the axial length of the centering hole and improve the guiding function.

The part of the clamp bent by burring, however, has a rounded section whose radius is equal to the thickness of the clamp. This results in reducing a fastening surface on the central part 103 of the clamp 101 and deteriorating a fastening force applied by the fastening head 113 of the clamping screw 111.

Patent Literature 1: Japanese Unexamined Patent Application Publications No. 2003-338101
Patent Literature 2: Japanese Unexamined Patent Application Publications No. 2004-95054

DESCRIPTION OF THE INVENTION

Problem to be Solved by the Invention

A problem to be solved by the invention complicates to secure both of a guiding function of a centering hole and a fastening surface in a clamp.

In order to secure both of a guiding function of a centering hole and a fastening surface, the present invention provides a clamp for a disk rotation driving device comprising, a central part and peripheral part, a centering hole formed through the central part, a contact portion circumferentially formed along the peripheral part, a fastening surface formed at the central part, the centering hole being fitted to an outer circumference of a centering projection circumferentially formed on a rotor to be rotary driven, and the clamp being fixed to the rotor with a clamping screw that is screwed into an axial center of the rotor so that a fastening head of the clamping screw fastens the fastening surface of the clamp toward the rotor and so that the contact portion comes in contact with an information recordable disk attached to the rotor and applies pressing load onto the disk in a rotation axis direction. The clamp further comprises a centering cylinder bent in an axial direction and having a circumferential inner surface defining the centering hole in the axial direction, a rounded section provided along an edge of the centering hole and having a radius smaller than the thickness of the centering cylinder, and the fastening surface being continuous to the rounded section.

The present invention provides a method of manufacturing the clamp, the method shaping the radius of the rounded section by material movement of a clamp material when pressing a part of the clamp material into the centering cylinder.

Effect of the Invention

According to the present invention, a clamp for a disk rotation driving device comprises, a central part and peripheral part, a centering hole formed through the central part, a contact portion circumferentially formed along the peripheral part, a fastening surface formed at the central part, the centering hole being fitted to an outer circumference of a centering projection circumferentially formed on a rotor to be rotary driven, and the clamp being fixed to the rotor with a clamping screw that is screwed into an axial center of the rotor so that a fastening head of the clamping screw fastens the fastening surface of the clamp toward the rotor and so that the contact portion comes in contact with an information recordable disk attached to the rotor and applies pressing load onto the disk in a rotation axis direction. The clamp further comprises a centering cylinder bent in an axial direction and having a circumferential inner surface defining the centering hole in the axial direction, a rounded section provided along an edge of the centering hole and having a radius smaller than the thickness of the centering cylinder, and the fastening surface being continuous to the rounded section.

The centering cylinder improves a guiding function with respect to the centering projection when fastening with the clamping screw. The clamp is then efficiently and accurately attached to the rotor. The rounded section is provided along the edge of the centering hole and has the radius smaller than the thickness of the centering cylinder and the fastening surface is continuous to the rounded section. This provides the fastening surface with a sufficient area.

According to the present invention, a method shapes the radius of the rounded section by material movement of the clamp material when pressing a part of the clamp material into the centering cylinder.

This elongates an axial length of the centering hole without increasing the weight of the clamp to secure the fastening surface.

EXPLANATIONS OF LETTERS OR NUMERALS

1 Clamp
3 Disk Rotation Driving Device
5 Magnetic Disk (Disk)
9 Hub (Rotor)
18 Centering Hole
21 Clamping Screw
23 Fastening Head
25, 25a Fastening Surface, Fastening Surface Extension
29 Rounded Section
33, 33a Centering Surface, Centering Surface Extension
R Radius
t Thickness

BEST MODE FOR CARRYING OUT THE INVENTION

An embodiment accomplishes an object to secure both of a guiding function of a centering hole and a fastening surface by a rounded section provided along an edge of the centering hole and having a radius smaller than a thickness of a centering cylinder and the fastening surface being continuous to the rounded section.

Embodiment 1

[Clamp]

Figure 1:
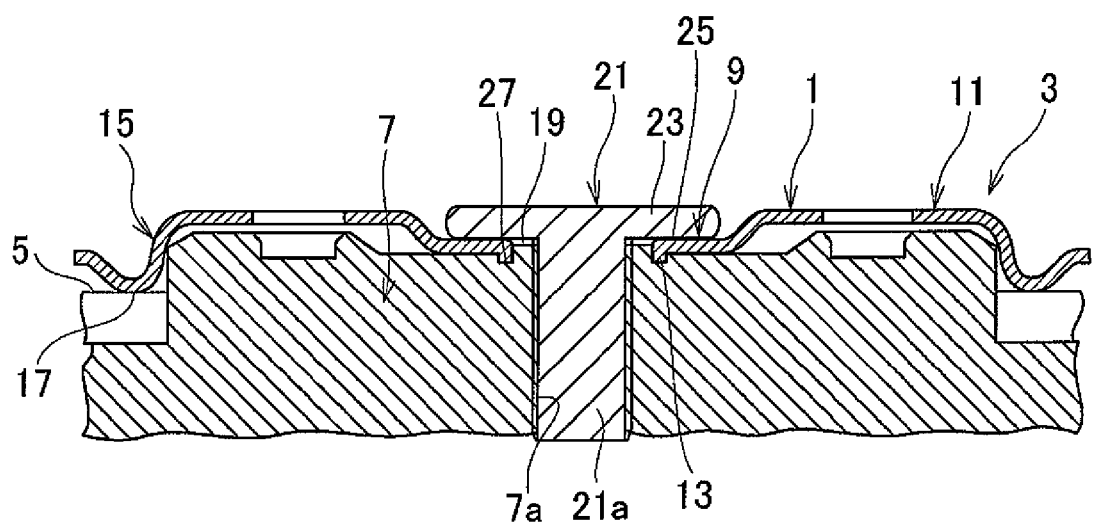
FIG. 1 It is a sectional view partly illustrating a disk rotation driving device in which a disk is fixed to a hub with a clamp (Embodiment 1).
Figure 2:
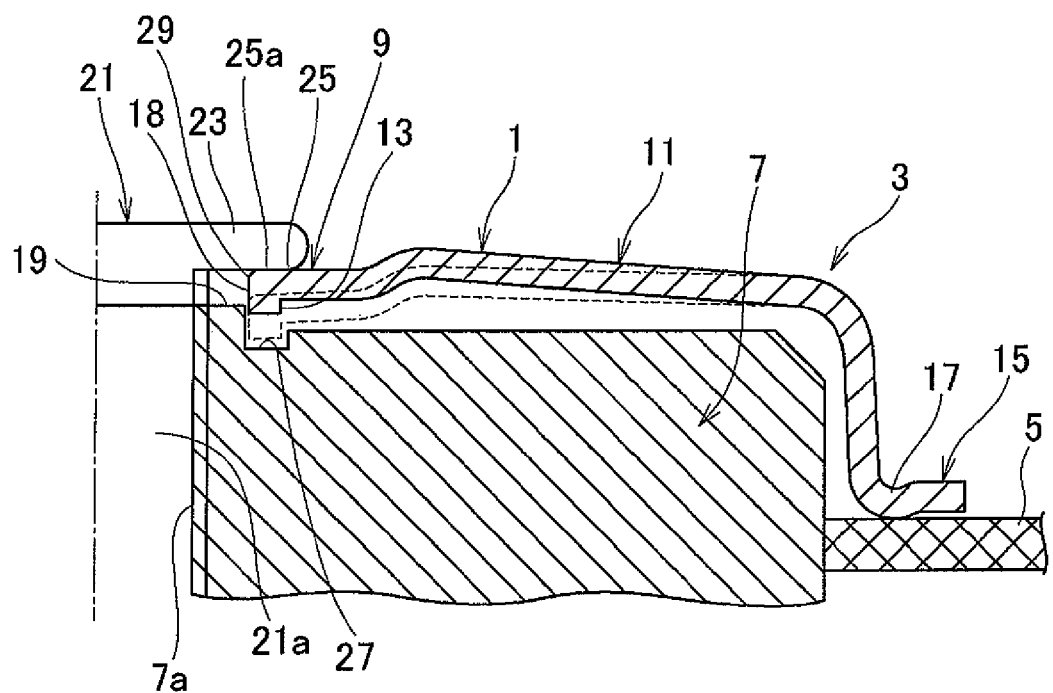
FIG. 2 It is an enlarged sectional view partly illustrating the disk rotation driving device in which the disk is fixed to the hub with the clamp (Embodiment 1).
Figure 3:
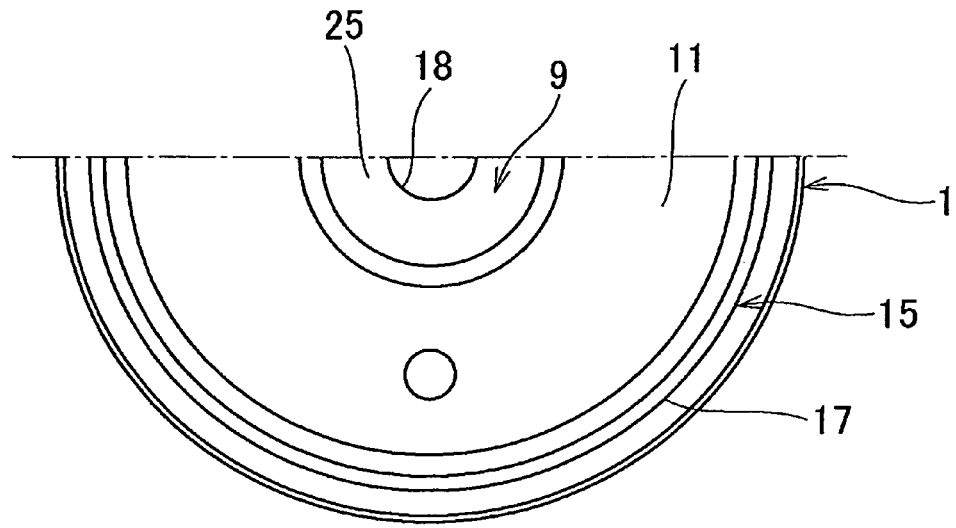
FIG. 3 It is a plan view illustrating a half of the clamp (Embodiment 1).
Figure 4:
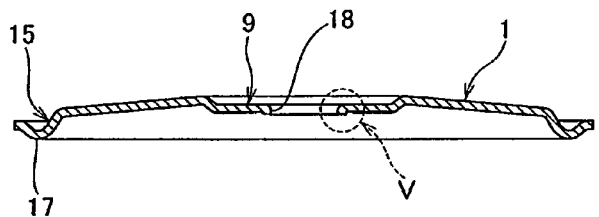
FIG. 4 It is a sectional view illustrating the clamp (Embodiment 1).
Figure 5:
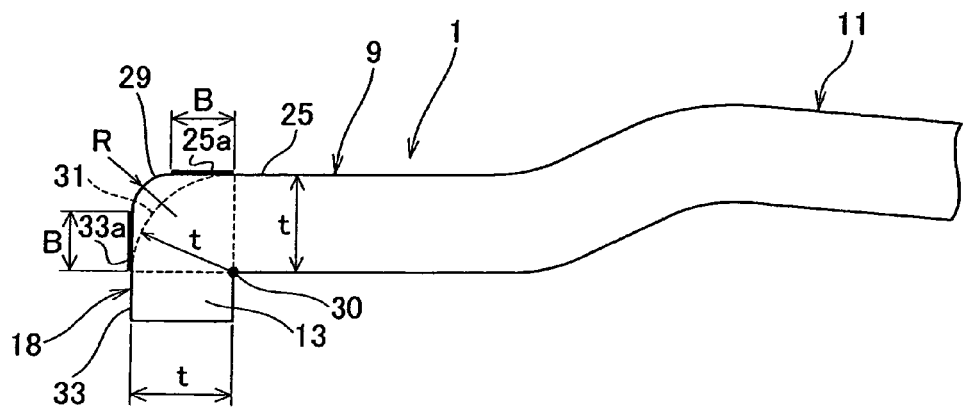
FIG. 5 It is an enlarged sectional view illustrating a part V of FIG. 4 (Embodiment 1).

FIG. 1 is a sectional view partly illustrating a disk rotation driving device in which a disk is fixed to a hub with a clamp according to an embodiment 1 of the present invention, FIG. 2 is an enlarged sectional view partly illustrating the disk rotation driving device in which the clamp is not yet fastened with a clamping screw, FIG. 3 is a plan view illustrating a half of the clamp, FIG. 4 is a sectional view illustrating the clamp, and FIG. 5 is an enlarged sectional view illustrating a part V of FIG. 4.

As shown in FIG. 1, the clamp 1 is arranged in the disk rotation driving device 3 such as a small mobile hard disk drive, e.g. a 1.8-inch hard disk drive. The disk rotation driving device 3 drives an information recordable/readable magnetic disk 5.

In the disk rotation driving device 3, the magnetic disk 5 is attached to a hub 7 corresponding to a rotor with the clamp 1 that applies pressing load in a direction along a rotation axis onto the disk 5, thereby fixing the disk 5 to the hub 7.

The clamp 1 is made from, for example, a resilient stainless steel plate and is a rotating body with a hat-like sectional shape. The clamp 1 has a central part 9 and a peripheral part 11, and the central part 9 is recessed with respect to the peripheral part 11.

The central part 9 of the clamp 1 has a centering cylinder 13 that is bent in an axial direction along an inner circumferential edge of the central part 9. The clamp 1 also has a contact portion 17 along an outer circumference 15 thereof. An inner circumference of the centering cylinder 13 defines a centering hole 18 extending in an axial direction.

The centering hole 18 of the clamp 1 is fitted to an outer circumference of a centering projection 19 that is formed on the hub 7 circumferentially around a rotation axis of the hub 7. A clamping screw 21 is screwed into an axial center of the hub 7, so that a fastening head 23 of the clamping screw 21 fastens a fastening surface 25 formed at the central part 9 of the clamp 1 toward the hub 7. At this time, a tip of the centering cylinder 13 enters in a circumferential recess 27 formed along an outer circumference of a base of the centering projection 19. In this state, the contact portion 17 of the clamp 1 comes in contact with the magnetic disk 5 and applies pressing force in an axial direction onto the disk 5.

As shown in FIGS. 1 to 5, the centering cylinder 13 has a rounded section 29 to define an edge of the centering hole 18. The rounded section 29 has a radius R that is smaller than the thickness t of the centering cylinder 13. The rounded section 29 is continuous to both of the fastening surface 25 and the centering hole 18.

The radius R of the rounded section 29 is in the range of 30% to 50% of the thickness t of the centering cylinder 13. For example, t=0.4 mm and R=0.12 to 0.2 mm.

The centering cylinder 13 has an inside corner 30. The inside corner 30 may have a right angle, or may be curved at a radius of, for example, 0.1 mm.

In FIG. 5, a dotted line illustrates an imaginary rounded section 31 whose radius is equal to the thickness t of the centering cylinder 13. Compared to the rounded section 31, the rounded section 29 adds a fastening surface extension 25a having a width B relative to the central part 9, as well as a centering surface extension 33a having the width B relative to a centering surface 33 of the centering cylinder 13.

The radius R of the rounded section 29 is shaped by material movement of a clamp material when pressing a part of the clamp material into the centering cylinder 13.

The clamp 1 is arranged on the hub 7 so that the contact portion 17 is placed in contact with the magnetic disk 5 attached to the hub 7. At this time, the tip of the centering cylinder 13 fits with the centering projection 19 of the hub 7, as illustrated with a continuous line in FIG. 2.

Then, a threaded shaft 21a of the clamping screw 21 is screwed into a threaded hole 7a of the hub 7, so that the fastening head 23 fastens the fastening surface 25 and extension 25a thereof of the clamp 1. At this time, the clamp 1 resiliently deforms and the centering cylinder 13 gradually engages with the centering projection 19 while the centering cylinder 13 achieving the guiding function with respect to the centering projection 19.

With this fastening, the resiliency of the clamp 1 causes the contact portion 17 to apply pressing load in an axial direction onto the magnetic disk 5, so that the disk 5 is fixedly supported by the hub 7.

[Method of Manufacturing Clamp]

Figure 6A:
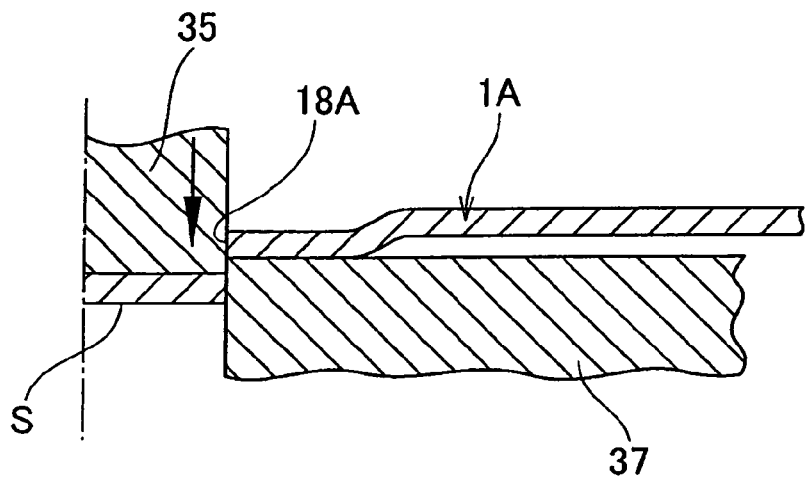
FIGS. 6(a), 6(b), and 6(c) are sectional views illustrating first, second and third steps of a method of manufacturing a clamp, respectively (Embodiment 1).
Figure 6B:
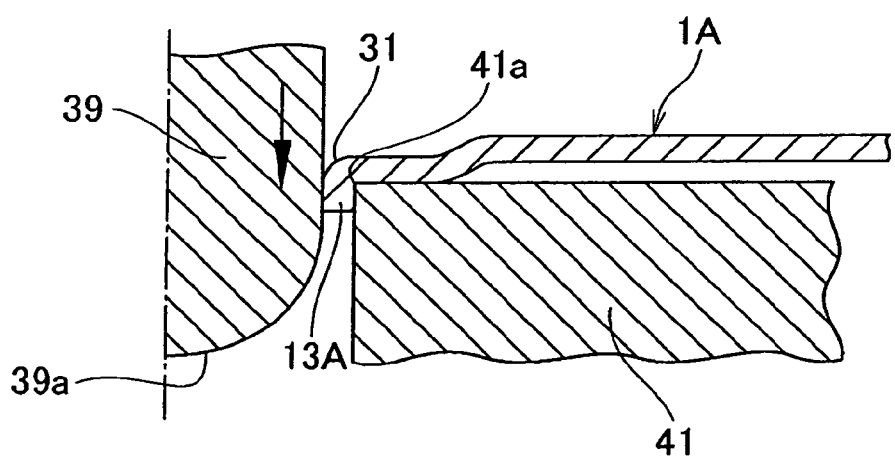
Figure 6C:
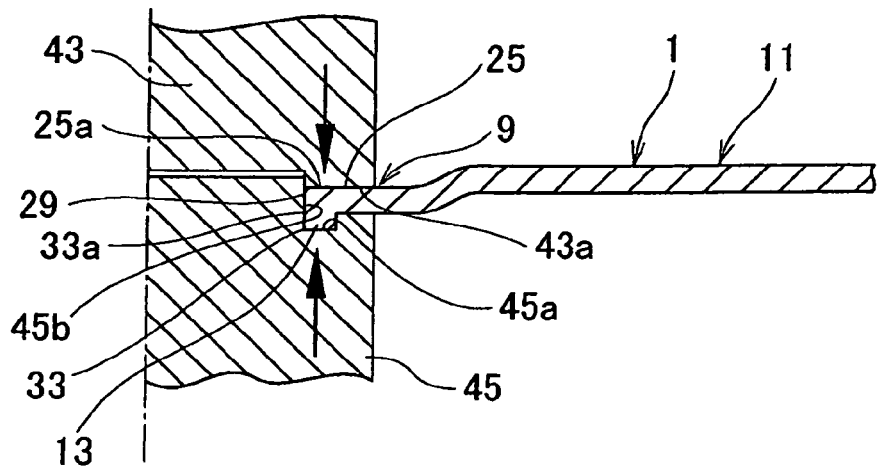
Figure 7:
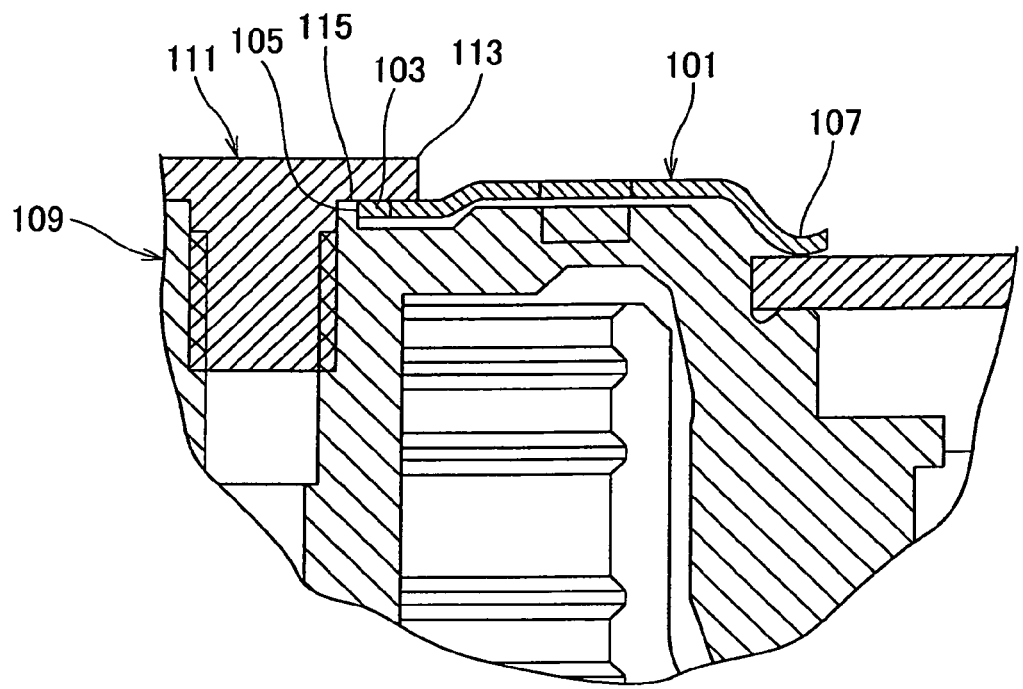
FIG. 7 It is a sectional view partly illustrating a disk rotation driving device in which a clamp is fastened with a clamping screw (Related Art).

FIGS. 6(a), 6(b), and 6(c) are sectional views illustrating first, second and third steps according to a method of manufacturing the clamp according to the embodiment of the present invention, respectively.

The method according to the embodiment conducts material movement of a clamp material when pressing a part of the clamp material into the centering cylinder 13, to form the rounded section 29 having a radius R that is smaller than the thickness t of the centering cylinder 13. At the same time, the method forms the fastening surface extension 25a having a width B and being continuous to the rounded section 29 and the centering surface extension 33a having the width B and being continuous to the centering surface 33.

The method forms the centering cylinder 13 and rounded section 29 in three steps as illustrated in FIGS. 6(a) to 6(c).

The first step of FIG. 6(a) uses a punch 35 and a die 37 to cut off a scrap S from a clamp material 1A and form a base hole 18A.

The second step of FIG. 6(b) employs a punch 39 and a die 41 to carry out a barring operation that bends a portion 13A to be shaped into the centering cylinder 13 along an edge of the base hole 18A. The punch 39 has a front end 39a having a large radius. The die 41 has an inner edge 41a substantially having a right angle.

The third step of FIG. 6(c) employs a punch 43 and a die 45 to axially press the portion 13A into the centering cylinder 13 having the rounded section 29. The centering cylinder 13 and rounded section 29 are formed by material movement of the clamp material 1A.

The punch 43 has a pressing surface 43a to form the fastening surface 25 and extension 25a. The die 45 has a pressing recess 45a and a guide surface 45b. The pressing recess 45a is shallower than the height of the portion 13A and the guide surface 45b extends in a pressing direction (indicated with arrows), to shape the centering cylinder 13 and centering surface 33 and extension 33a.

Effect of Embodiment

The clamp 1 for the disk rotation driving device 3 according to the embodiment has the central part 9 and the peripheral part, the centering hole 18 formed through the central part 9, the contact portion 17 circumferentially formed along the peripheral part, and the fastening surface 25 formed at the central part 9. The centering hole 18 is fitted to an outer circumference of the centering projection 19 circumferentially formed on the hub 7 of the disk rotation driving device 3, and the clamp 1 is fixed to the hub 7 with the clamping screw 21 that is screwed into an axial center of the hub 7 so that the fastening head 23 of the clamping screw 21 fastens the fastening surface 25 of the clamp 1 toward the hub 7 and so that the contact portion 17 of the clamp 1 comes in contact with the magnetic disk 5 attached to the hub 7 and applies pressing load onto the disk 5 in a rotation axis direction. The clamp 1 includes the centering cylinder 13 bent in an axial direction. The centering cylinder 13 has a circumferential inner surface defining the centering hole 18 extending in the axial direction. The rounded section 29 is provided along an edge of the centering hole 18 and has a radius smaller than the thickness of the centering cylinder 13. The fastening surface 25 is continuous to the rounded section 29.

When fastening with the clamping screw 21, the centering cylinder 13 performs a guiding function with respect to the centering projection 19, to efficiently and accurately fit the clamp 1 to the hub 7.

When the clamping screw 21 is fastened so that the fastening head 23 of the clamping screw 21 fastens the fastening surface 25 and extension 25a of the clamp 1, a tip of the centering cylinder 13 engages with the centering projection 19 from the begging of the fastening operation. This prevents an assembling error such that the centering cylinder 13 is placed on and fixed to the centering projection 19.

When fastening the clamping screw 21, the centering cylinder 13 may be positioned away from the centering projection 19. In this case, the centering cylinder 13 keeps an attitude axially aligned with the centering projection 19 when receiving the fastening force. As a result, the clamp 1 is surely fitted to the hub 7.

The rounded section 29 having a radius R smaller than the thickness t of the centering cylinder 13 extends along an edge of the centering hole 18 and the fastening surface 25 is continuous to the rounded section 29. The fastening surface 25 and extension 25a secure a sufficient fastening area.

This allows the clamping screw 21 to surely fix the clamp 1 to the hub 7 without plays.

The centering hole 18 is continuous to the rounded section 29.

The rounded section 29 having a radius smaller than the thickness of the centering cylinder 13 elongates the centering hole 18 in an axial direction without elongating the centering cylinder 13. This results in securing the centering surfaces 33 and 33a.

Even if the height of the centering cylinder 13 is low or the thickness thereof is thin, the rounded section 29 is effective to secure the sufficient centering surfaces 33 and 33a that help the clamp 1 to be efficiently and accurately attached to the hub 7.

The radius of the rounded section 29 is in the range of 30% to 50% of the thickness t of the centering cylinder 13.

This secures the sufficient centering surface 33 and extension 33a.

According to the method of manufacturing the clamp 1, the radius R of the rounded section 29 is formed by material movement of the clamp material 1A when pressing a part of the clamp material 1A into the centering cylinder 13.

This elongates the centering hole 18 and secures the fastening surface 25 and extension 25a without increasing the weight of the clamp 1.

The manufacturing method includes the first step forming the base hole 18A in the clamp material 1A, the second step bending a portion 13A to be shaped into the centering cylinder 13 along the base hole 18A, and the third step forming the centering cylinder 13 and rounded section 29 by axially pressing the portion 13A.

The rounded section 29 is formed along the edge of the centering hole 18 and has a radius smaller than the thickness of the centering cylinder 13. This rounded section 29 easily secures the sufficient fastening surface 25 and centering surface 33 and extensions 25a and 33a respectively thereof.

[Others]

When applied to small hard disk drives, the present invention will remarkably miniaturize the drives. For hard disk drives of any size, the present invention will secure both the guiding function of a centering hole and fastening surfaces.

The invention claimed is:

1. A clamp for a disk rotation driving device comprising, a central part and peripheral part, a centering hole formed through the central part, a contact portion circumferentially formed along the peripheral part, a fastening surface formed at the central part, the centering hole being fitted to an outer circumference of a centering projection circumferentially formed on a rotor to be rotary driven, and the clamp being fixed to the rotor with a clamping screw that is clamping screwed into an axial center of the rotor so that a fastening head of the clamping screw fastens the fastening surface of the clamp toward the rotor and so that the contact portion comes in contact with an information recordable disk attached to the rotor and applies pressing load onto the disk in a rotation axis direction, the clamp further comprising:

a centering cylinder bent from the central part of the clamp in an axial direction and having a thickness equal to a thickness of the central part and a circumferential inner surface defining the centering hole in the axial direction; and a rounded section provided along an edge of the centering hole so as to be rounded from a bended end of the centering cylinder that extends with the centering cylinder bend from the central part of the clamp, the rounded section having a radius smaller than the thickness of the centering cylinder, the fastening surface being continuous to and adjoining the rounded section so that the fastening surface comprises an extension having a thickness within a range of the thickness of the centering cylinder relative to the radius of the rounded section, the circumferential inner surface being continuous to and adjoining the rounded section so that the circumferential inner surface comprises an extension having a thickness within a range of the thickness of the central part relative to the radius of the rounded section, and the extensions of the fastening surface and circumferential inner surface comprise the same width in an extended direction thereof.

2. The clamp for a disk rotation driving device of claim 1, wherein the radius of the rounded section is within a range of 30% to 50% of the thickness of the centering cylinder.

3. A method of manufacturing the clamp for a disk rotation driving device of claim 1, comprising:
    shaping the radius of the rounded section and the extensions of the fastening surface and the circumferential inner surface by material movement of a clamp material when pressing a part of the clamp material into the centering cylinder.

4. The method of claim 3, comprising:
a first step of forming a base hole in the clamp material;
a second step of bending a portion to be shaped into the centering cylinder along the base hole; and
a third step of pressing the portion to be shaped into the centering cylinder in an axial direction, thereby finishing the centering cylinder and the rounded section so as to form the extensions of the fastening surface and the circumferential inner surface.

* * * * *